(12) United States Patent
Jang et al.

(10) Patent No.: US 11,835,498 B2
(45) Date of Patent: Dec. 5, 2023

(54) HIGH THROUGHPUT GAS-CHROMATOGRAPHY SYSTEM FOR ADDITIVE ANALYSIS, AND ANALYSIS METHOD USING SAME

(71) Applicant: LG Chem, Ltd., Seoul (KR)

(72) Inventors: Rin Jang, Daejeon (KR); Mi Kyoung Jin, Daejeon (KR); Moon Ja Nam, Daejeon (KR); Byoung Hyoun Kim, Daejeon (KR)

(73) Assignee: LG Chem, Ltd.

( * ) Notice: Subject to any disclaimer, the term of this patent is extended or adjusted under 35 U.S.C. 154(b) by 691 days.

(21) Appl. No.: 16/758,280

(22) PCT Filed: Oct. 29, 2018

(86) PCT No.: PCT/KR2018/012904
§ 371 (c)(1),
(2) Date: Apr. 22, 2020

(87) PCT Pub. No.: WO2019/164087
PCT Pub. Date: Aug. 29, 2019

(65) Prior Publication Data
US 2020/0340958 A1    Oct. 29, 2020

(30) Foreign Application Priority Data

Feb. 23, 2018    (KR) .................. 10-2018-0021608

(51) Int. Cl.
*G01N 30/88* (2006.01)
*G01N 30/68* (2006.01)
(Continued)

(52) U.S. Cl.
CPC ........... *G01N 30/68* (2013.01); *G01N 27/624* (2013.01); *G01N 30/7206* (2013.01); *G01N 30/88* (2013.01)

(58) Field of Classification Search
CPC .................................................. G01N 30/68
See application file for complete search history.

(56) References Cited

U.S. PATENT DOCUMENTS 4,479,380 A * 10/1984 Novotny ............ B01D 11/0407
210/659
4,576,917 A * 3/1986 Schabron ............. G01N 33/442
422/550

(Continued)

FOREIGN PATENT DOCUMENTS

CN    101852766 A    10/2010
CN    101936973 A    1/2011

(Continued)

OTHER PUBLICATIONS

Dan, L. et al., "Determination of Phthalates in PVC Plastic through Solution-precipitation-GC/MS Method," Plastic Technology, Dec. 31, 2010, 1 page, vol. 33, No. 3. [Abstract Only].

(Continued)

*Primary Examiner* — Jamel E Williams
*Assistant Examiner* — Alex T Devito
(74) *Attorney, Agent, or Firm* — Lerner David LLP

(57) ABSTRACT

A high throughput gas-chromatography system for analysis of high-molecular weight additives in a polymer material, and an analysis method using same are provided. A high throughput gas-chromatography system is capable of qualitatively and quantitatively analyzing, at the same time, high-molecular weight additives in a polymer, and reducing analysis time by increasing a heating rate and a column maximum temperature.

5 Claims, 6 Drawing Sheets

(51) Int. Cl.
*G01N 27/624* (2021.01)
*G01N 30/72* (2006.01)

(56) References Cited

U.S. PATENT DOCUMENTS

| | | | |
|---|---|---|---|
| 5,141,534 A * | 8/1992 | Sacks | G01N 30/40 |
| | | | 96/102 |
| 5,191,211 A * | 3/1993 | Gorman, Jr. | H01J 41/04 |
| | | | 73/23.35 |
| 6,183,635 B1 * | 2/2001 | Klee | B01D 15/08 |
| | | | 210/659 |
| 7,365,316 B2 | 4/2008 | Miller et al. | |
| 8,378,293 B1 | 2/2013 | Quimby et al. | |
| 2008/0296487 A1 | 12/2008 | Lubkowitz et al. | |
| 2013/0062515 A1 | 3/2013 | Quimby et al. | |
| 2013/0333444 A1 | 12/2013 | Kanai et al. | |
| 2014/0157871 A1 | 6/2014 | Dubant et al. | |
| 2014/0290491 A1 | 10/2014 | Kanai et al. | |
| 2016/0116446 A1 | 4/2016 | Sugihara et al. | |

FOREIGN PATENT DOCUMENTS

| | | | | |
|---|---|---|---|---|
| CN | 102662020 | A | | 9/2012 |
| CN | 203053930 | U | | 7/2013 |
| CN | 103852535 | A | | 6/2014 |
| CN | 105203691 | A | | 12/2015 |
| CN | 105954449 | A | | 9/2016 |
| CN | 106596745 | A | | 4/2017 |
| DE | 102008032097 | A1 * | 1/2010 | ......... B01J 19/0046 |
| JP | 2001221786 | A | | 8/2001 |
| JP | 2004037416 | A | | 2/2004 |
| JP | 2004205313 | A | | 7/2004 |
| JP | 2005249691 | A | | 9/2005 |
| JP | 2011149844 | A | | 8/2011 |
| JP | 201361324 | A | | 4/2013 |
| JP | 2013238572 | A | | 11/2013 |
| JP | 2014202508 | A | | 10/2014 |
| JP | 5797959 | B2 | | 10/2015 |
| KR | 20170040878 | A | | 4/2017 |
| WO | 2014175307 | A1 | | 10/2014 |
| WO | 2014179646 | A1 | | 11/2014 |

OTHER PUBLICATIONS

Si-Yuan, L. et al., "GC-MS Determination of Phthalates Added as Plasticizers in PVC Plastics for Making Toys," Physical and chemical testing (chemical volume), Dec. 31, 2009, 1 Page. [Abstract Only].

Jianshe, Z. "Simultaneously application of dual-column and dual detectors on chromatograph-mass spectrometry-FID system," Dec. 31, 2014, 1 Page. [Abstract Only].

Kai, C. "Component Analysis of Fuels by Comprehensive Two-dimensional Gas Chromatography and Simultaneous Multi-channel Detection," Chemical World, Dec. 31, 2014, 1 Page, vol. 55. [Abstarct Only].

Rong, L. et al. "Determination of 28 phthalate esters in baked foods by gas chromatography-triple quadrupole mass spectrometry," Chromatography, May 31, 2016; 2 pages, vol. 34. [Abstract Only].

Liang, H. et al., "Compositional Analysis of Gases in Natural Gas Hydrates by GC-FID/TCD," Journal of Instrumental Analysis, Dec. 31, 2012, 1 Page. [Abstract Only].

Search Report dated Jan. 21, 2022 from the Office Action for Chinese Application No. 201880065254.8 dated Feb. 8, 2022, pp. 1-4.

Bart et al.: "Polymer additive analysis at the limits", Polymer Degradation and Stability, Barking, GB, vol. 82, No. 2, Jan. 1, 2003, pp. 197-205.

Extended European Search Report for Application No. EP 18907202. 8, dated Mar. 10, 2021, 10 pages.

Application News, Analysis of 6 Phthalate Esters in Polyvinyl Chloride Toys by GC-FID, Shimadzu, Gas Chromatography No. G275, Sep. 16, 2010, pp. 1-2, Retrieved from https://www.ssi.shimadzu.com/sites/ssi.shimadzu.com/files/products/literature/gc/g275.pdf.

Honnold, et al., Analysis of Terpenes in Cannabis Using the Agilent 7697A/7890B/5977B Headspace GC-MSD System, Agilent Technologies, Sep. 26, 2017, pp. 1-10, Retrieved from https://www.agilent.com/cs/library/applications/5991-499EN_cannabis_terpenes_application.pdf.

International Search Report for Application No. PCT/KR2018/012904 dated Feb. 28, 2019, 3 pages.

* cited by examiner

[Fig. 1]
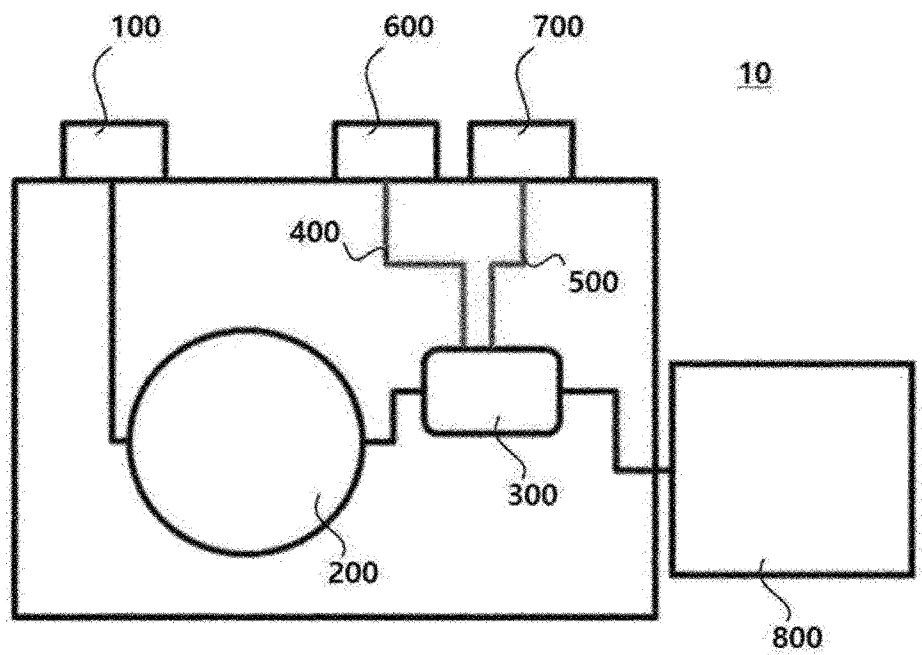
[Fig. 2]
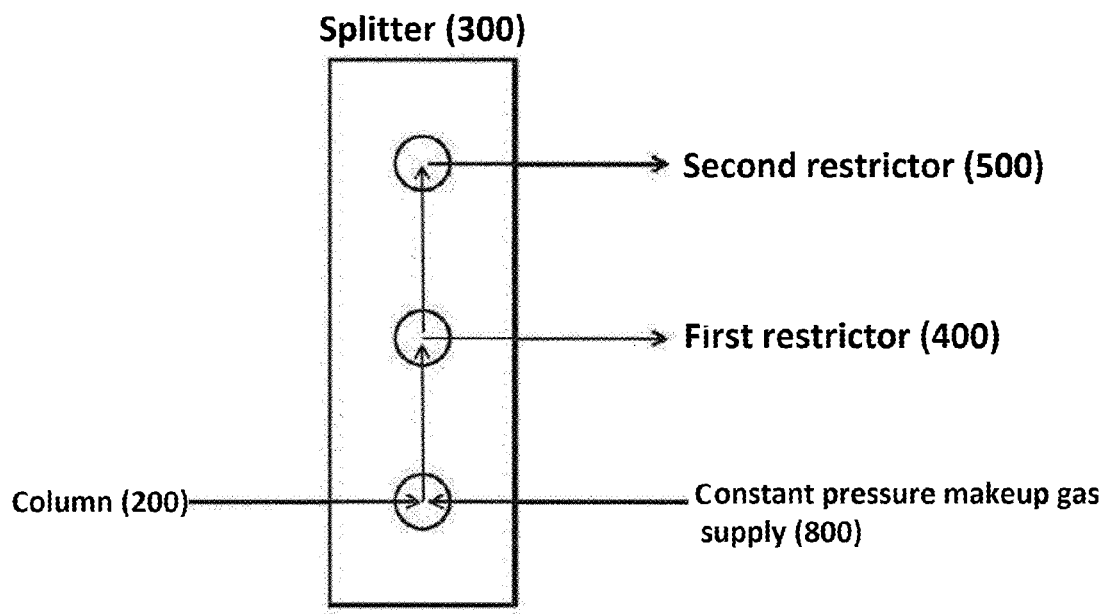

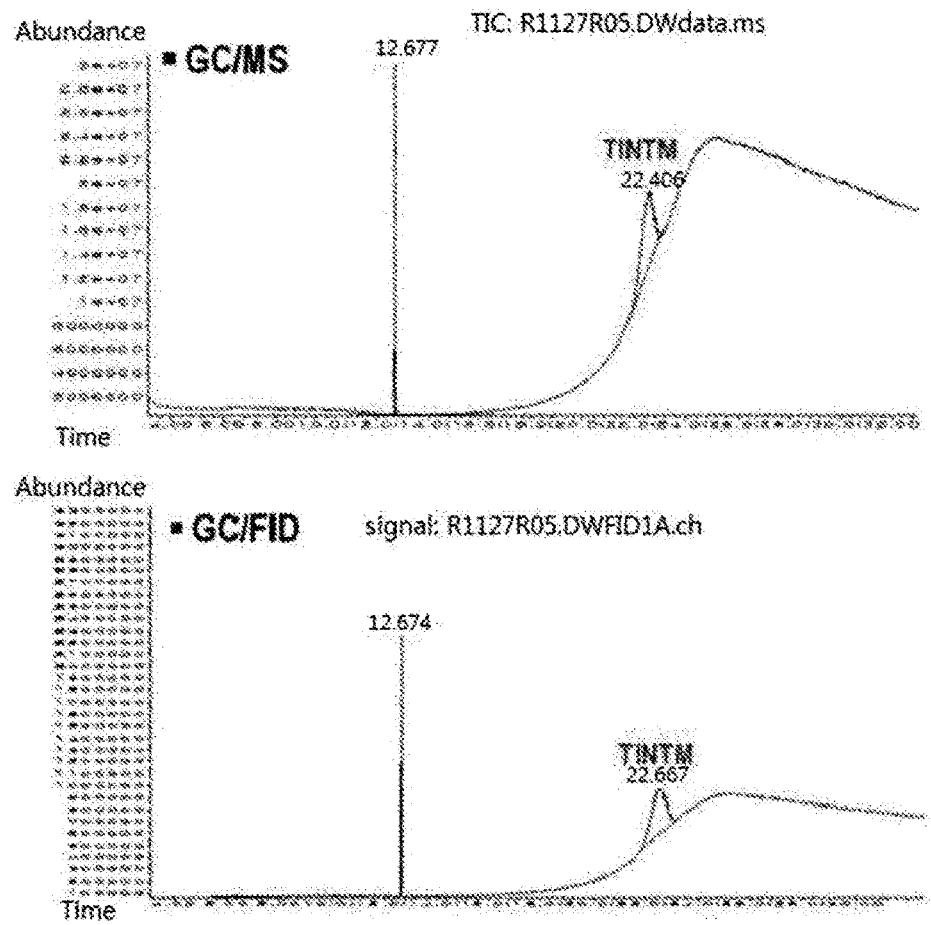
[Fig. 3]

[Fig. 4a]
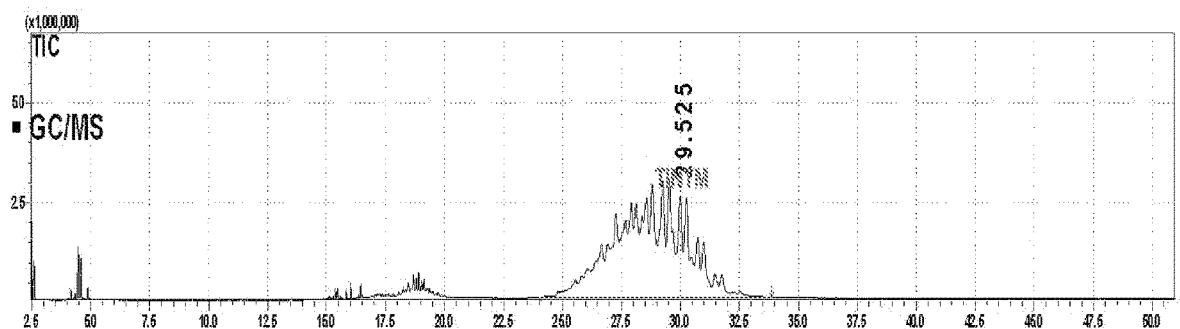
[Fig. 4b]
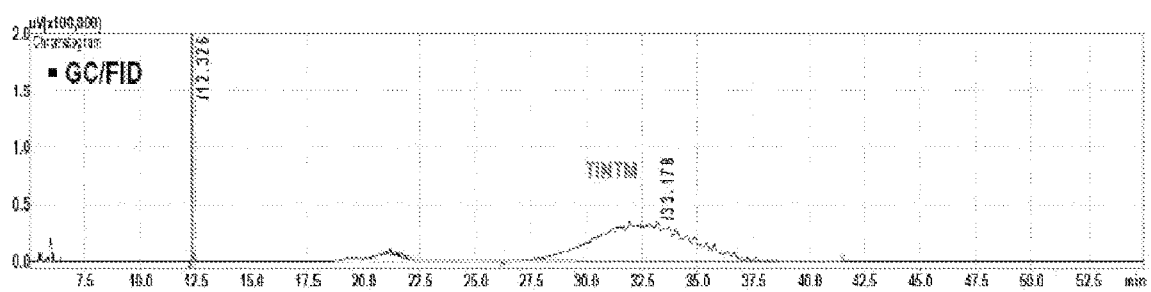

[Fig. 5]
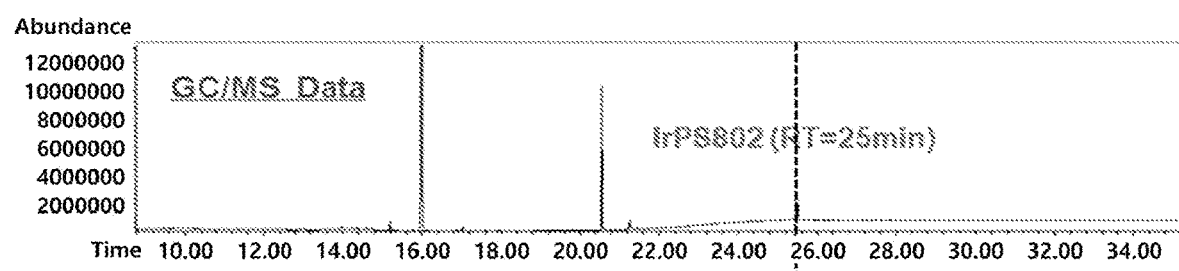
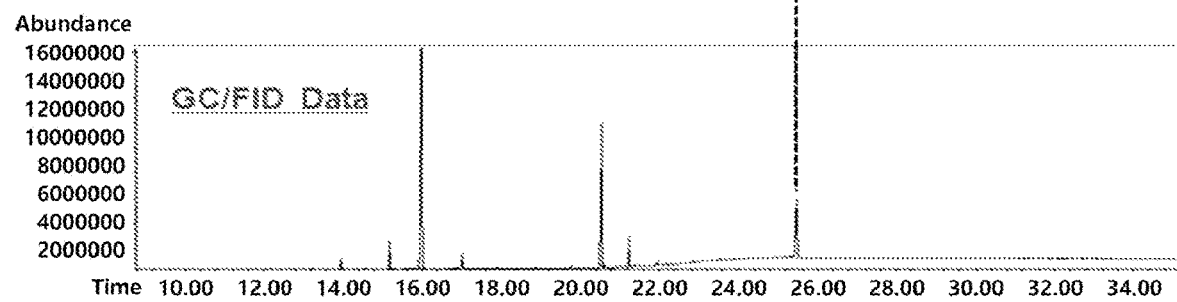

[Fig. 6a]
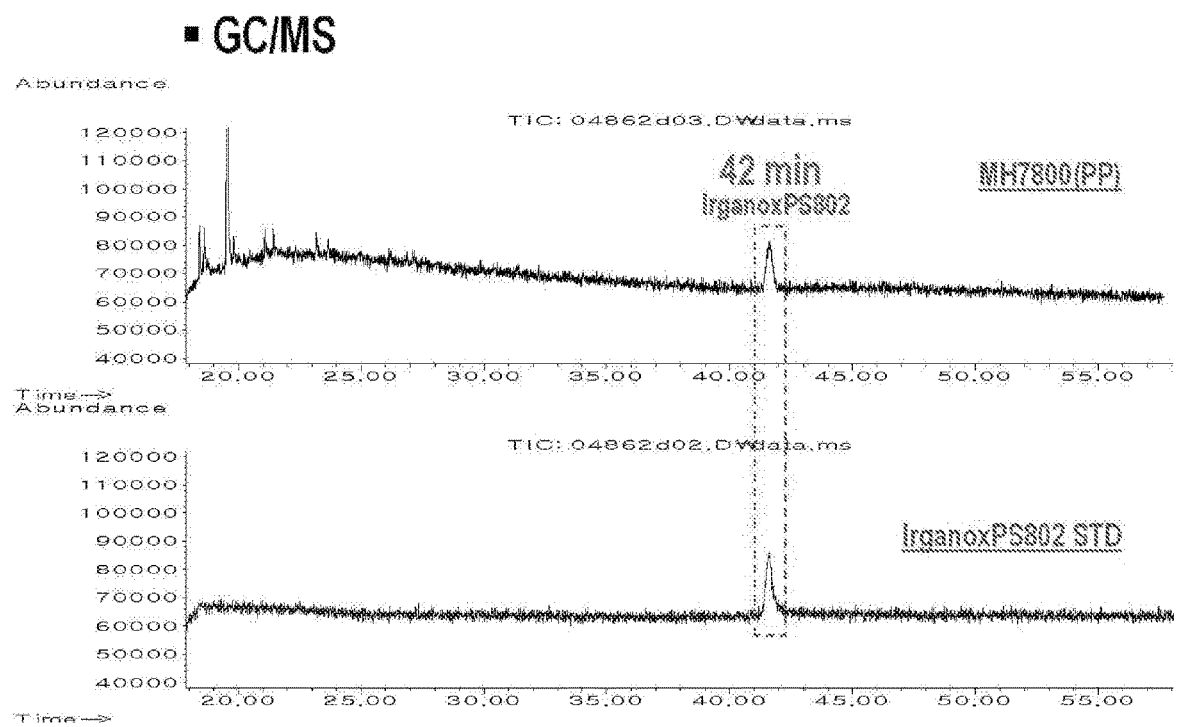

[Fig. 6b]
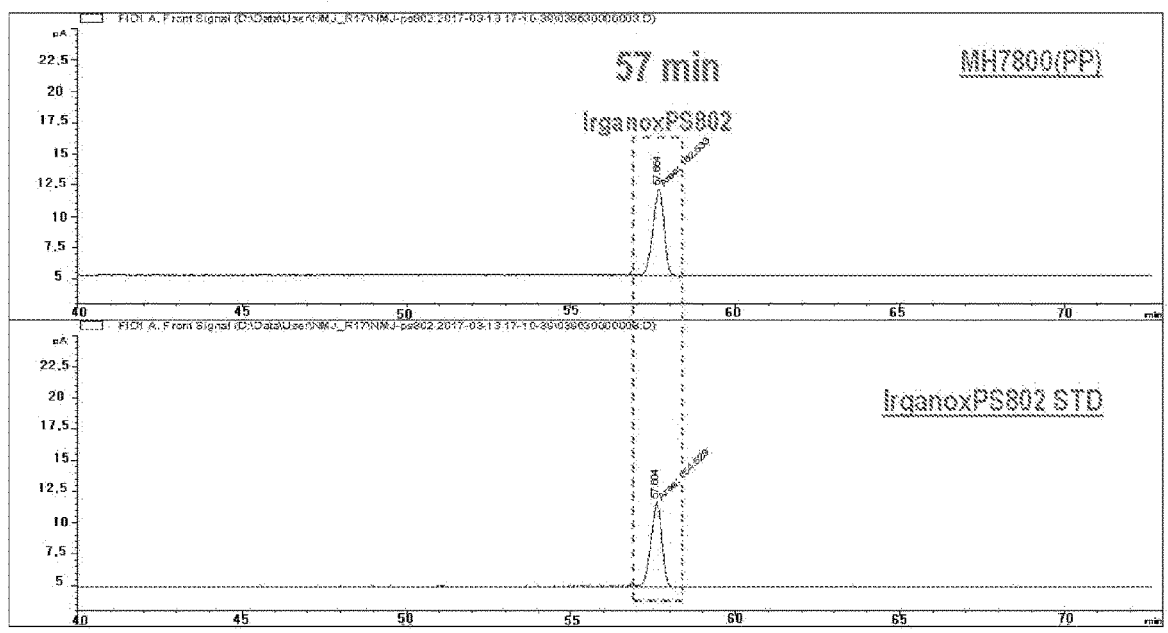

HIGH THROUGHPUT GAS-CHROMATOGRAPHY SYSTEM FOR ADDITIVE ANALYSIS, AND ANALYSIS METHOD USING SAME

1. CROSS-REFERENCE TO RELATED APPLICATIONS

This application is a national phase entry under 35 U.S.C. § 371 of International Application No. PCT/KR2018/012904, filed Oct. 29, 2018, which claims priority to Korean Patent Application No. 10-2018-0021608, filed Feb. 23, 2108, the disclosures of which are incorporated herein by reference.

2. Field of the Invention

The present invention relates to a high throughput gas chromatographic system for analysis of a high molecular weight additive in a polymeric material and to an analytical method using the same. More particularly, the present invention relates to a high throughput gas chromatographic system which enables to simultaneously carry out qualitative analysis and quantitative analysis of a high molecular weight additive in a polymeric material and to shorten the analysis time by raising a heating rate and a maximum column temperature, and to an analytical method using the same.

3. Description of the Related Art

In general, a high molecular weight additive having a molecular weight of 500 Da or more is often used in order to enhance properties of a polymer. In this case, the run time (RT) of gas chromatography (GC) usually takes one hour or more. Meanwhile, according to the prior art, qualitative analysis is performed by GC/MS (GC-Mass Spectrometry) and quantitative analysis is performed by using GC/FID (GC with Flame Ionization Detector). However, since a device for qualitative analysis and quantitative analysis is separately required, there is a disadvantage that it takes a long time to perform such analysis.

SUMMARY OF THE INVENTION

To overcome the disadvantage of the prior art described above, it is an object of the present invention to provide a high throughput gas chromatographic system which enables to simultaneously carry out qualitative analysis and quantitative analysis of a high molecular weight additive in a polymeric material and to shorten the analysis time, and an analytical method using the same.

In order to solve the above problems, the present invention provides a high throughput gas chromatographic (GC) system for analysis of an additive, comprising:
an inlet through which a sample is injected;
a column to which the sample injected from the inlet is introduced;
a splitter for distributing the sample introduced into the column, to a flame ionization detector (FID) and a mass spectrometer (MS);
a first restrictor which is a path through which the sample moves between the splitter and the flame ionization detector;
a second restrictor which is a path through which the sample moves between the splitter and the mass spectrometer;
the mass spectrometer for qualitative analysis of the sample; and
the flame ionization detector for quantitative analysis of the sample,
wherein the high throughput gas chromatographic system enables to simultaneously perform qualitative analysis and quantitative analysis of the polymer sample.

In order to solve the above-mentioned problems, the present invention further provides a qualitative and quantitative analysis method of an additive in a polymer sample comprises the steps of:
(i) dissolving a polymer sample containing an additive with 5 to 40 mL of a first solvent relative to 1 g of the sample;
(ii) precipitating the sample of the solution of (i) with 10 to 100 mL of a second solvent relative to 1 g of the sample and filtering the precipitate to separate into the sample and a solution containing the additive; and
(iii) performing qualitative analysis and quantitative analysis of the solution containing the additive simultaneously by using the high throughput gas chromatographic (GC) system as described above.

Effect of the Invention

According to the high throughput gas chromatographic system for analyzing a high molecular weight additive and the analytical method using the same according to the present invention, qualitative analysis and quantitative analysis can be performed simultaneously, and analysis time can be greatly shortened by increasing the maximum column temperature, compared with the conventional qualitative/quantitative analysis.

BRIEF DESCRIPTION OF THE DRAWINGS

FIG. 1 shows a schematic diagram of the high throughput gas chromatographic system according to one embodiment of the present invention.

FIG. 2 shows a connection between the splitter 300 and other components in the high throughput gas chromatographic system according to FIG. 1.

FIG. 3 is a graph showing the results when qualitative analysis and quantitative analysis of a high molecular weight plasticizer are performed simultaneously using the high throughput gas chromatographic system according to FIG. 1.

FIGS. 4a and 4b are graphs showing the results when qualitative analysis and quantitative analysis of a high molecular weight plasticizer are preformed separately according to the prior art.

FIG. 5 is a graph showing the results when qualitative analysis and quantitative analysis of a high molecular weight antioxidant are performed simultaneously using a high throughput gas chromatographic system according to FIG. 1.

FIGS. 6a and 6b are graphs showing the results of qualitative analysis and quantitative analysis of a high molecular weight antioxidant are performed separately according to the prior art.

DETAILED DESCRIPTION OF THE INVENTION

Hereinafter, the high throughput gas chromatographic system and the analysis method according to one embodiment of the present invention will be described in detail. The accompanying drawings, which are included to provide a further understanding of the invention, illustrate embodiments of the invention and are not intended to limit the technical scope of the present invention.

In addition, the same or corresponding components will be denoted by the same reference numerals regardless of symbols, and redundant description thereof will be omitted. For convenience of explanation, the size and shape of each component shown may be exaggerated or reduced.

FIG. 1 shows a schematic diagram of the high throughput gas chromatographic system 10 according to one embodiment of the present invention.

The high throughput gas chromatographic system 10 includes an inlet 100, a column 200, a splitter 300, a first restrictor 400, a second restrictor 500, a flame ionization detector (FID) 600, a mass spectrometer (MS) 700, and a constant pressure makeup gas supply 800.

A sample that can be analyzed in the high throughput gas chromatographic system 10 according to one embodiment of the present invention may be, in one embodiment, a high molecular weight additive or a sample in which two or more high molecular weight additives are mixed, for example, an antioxidant and/or a plasticizer having a molecular weight of 500 Da or more. Such an additive sample is injected through the inlet 100.

The sample injected through the inlet 100 is transferred to the column 200. The column 200 is a column that allows for analysis at a high temperature (for example, 450° C. or less, or 420° C. or less, more specifically, 350° C. to 400° C.). In one embodiment, the column 200 is a high-temperature analytical column capable of analyzing at 350° C. to 450° C. As the column capable of analysis even at a high temperature, for example, stainless steel (SUS), a column made of a fused silica material having an exterior coated with polyimide or the like may be used.

As the column 200, a capillary column may be used, which has an inner diameter of 0.10 μm to 0.53 μm, for example. However, the type, size, material and the like of the column 200 in the high throughput gas chromatographic system 10 according to the present invention are not limited to those described above, and various variations and modifications may be made depending on various environments in which the present invention is implemented.

The sample passes through the splitter 300 via the column 200 as described above. The flame ionization detector 600 and the mass spectrometer 700 may be connected to the splitter 300 via a first restrictor 400 and a second restrictor 500, respectively. In addition, a constant pressure makeup gas supply 800 is also connected to the splitter 300. FIG. 2 schematically shows a connection between the splitter 300 and the respective components. The sample introduced from the column 200 may be distributed in the splitter 300 so that qualitative/quantitative analysis can be performed simultaneously in the flame ionization detector 600 and the mass spectrometer 700.

On the other hand, since the quantitative analysis in the flame ionization detector 600 is performed at normal pressure and the qualitative analysis in the mass spectrometer 700 is performed in a vacuum, a pressure difference is generated between the flame ionization detector 600 and the mass spectrometer 700. In the splitter 300 of the high throughput gas chromatographic system 10 according to the present invention, the sample may be distributed while minimizing the pressure difference between the flame ionization detector 600 and the mass spectrometer 700 during distribution of the sample.

More specifically, when distributing the sample into the first restrictor 400 and the second restrictor 500 from the splitter 300, a ratio of the amount of the sample to be distributed to the first restrictor 400 and the second restrictor 500 may be adjusted. For example, a ratio of the amount of the sample supplied to the first restrictor 400 connected to the flame ionization detector 600 to the amount of the sample supplied to the second restrictor 500 connected to the mass spectrometer 700 may be from 10:90 to 90:10, for example. Such a range of the ratio of the amounts of the sample is determined by considering the proper length adjustment of the restrictors.

For this purpose, the amount of each of the samples to be distributed to the first restrictor 400 and the second restrictor 500 may be adjusted by adjusting the length and/or the inner diameter of the first restrictor 400 and the second restrictor 500. The first restrictor 400 and the second restrictor 500 may each have a tubular shape. In one embodiment, a ratio of the length of the first restrictor 400 to the length of the second restrictor 500 may be 26.9:73.1, for example, if they have the same inner diameter when a ratio of the amount of the sample supplied to the first restrictor 400 connected to the flame ionization detector 600 to the amount of the sample supplied to the second restrictor 500 connected to the mass spectrometer 700 is 50:50 and the constant pressure makeup gas supply 800 and the column 200 have the same supply flow rate. Alternatively, in other embodiment, a ratio of the length of the first restrictor 400 to the length of the second restrictor 500 may be 59.6:40.4, for example, if they have the same inner diameter when a ratio of the amount of the sample supplied to the first restrictor 400 connected to the flame ionization detector 600 to the amount of the sample supplied to the second restrictor 500 connected to the mass spectrometer 700 is 20:80 and the constant pressure makeup gas supply 800 and the column 200 have a ration of supply flow rate of 80:20. In one embodiment, the ratio of the length of the first restrictor to the length of the second restrictor may be 3.5:96.5 to 76.8:23.2. By adjusting the length of the restrictors, a split ratio between the MS and the FID is adjusted.

In order to minimize the pressure difference when the sample is distributed to the flame ionization detector 600 and the mass spectrometer 700 via the first restrictor 400 and the second restrictor 500, respectively, in the splitter 300, the constant pressure makeup gas supply 800 is connected to the splitter 300 to supply a small amount of makeup gas to the second restrictor 500 connected to the mass spectrometer 700. The constant pressure makeup gas supply 800 is a device provided by the same company as the gas chromatography manufacturer, for example, Aux EPC (G3440 A Option 301) from Agilent may be used. As the makeup gas, for example, helium (He) or the like may be used. The amount of the makeup gas supplied to the second restrictor 500 may be, for example, 1 mL to 10 mL per minute. However, the type, amount, and the like of the makeup gas supplied from the constant pressure makeup gas supply 800 to the second restrictor 500 via the splitter 300 in the high throughput gas chromatographic system 10 according to the present invention are not limited to those described above, and various variations and modifications may be made depending on various environments in which the present invention is implemented.

For example, by setting the length of the first restrictor 400 to 1.026 m and the inner diameter to 0.15 μm and setting the length of the second restrictor 500 to 21.475 m and the inner diameter to 0.25 μm, the ratio of the amount of the sample supplied to the first restrictor to the amount of the sample supplied to the second restrictor may be 50:50 when the constant pressure makeup gas supply 800 and the column 200 have the same flow rate.

For high-temperature analysis, it is preferred that the splitter 300, the first restrictor 400 and the second restrictor 500 are also of a material that can be tolerated at high temperature (for example, 450° C. or less, or 420° C. or less, more specifically 350° C. to 400° C.). The material of the splitter 300 may be, for example, stainless steel (SUS) or the like. In addition, the material of each of the first restrictor 400 and the second restrictor 500 may be, for example, stainless steel (SUS) or the like. For example, splitter 300 may a device provided by the same company as the gas chromatography manufacturer, for example, a two-way Splitter with Makeup Gas Accessory for Existing 7890A or 6890N GCs (G3180B), from Agilent's Aux EPC (G3440A Option 301). The first restrictor 400 and the second restrictor 500 may be an Ultra ALLOYR® Deactivated Tube from Frontier Laboratories, respectively.

However, the dimensions, materials and the like of the splitter 300, the first restrictor 400 and the second restrictor 500 in the high throughput gas chromatographic system 10 according to the present invention, are not limited to those described above, and various variations and modifications may be made depending on various environments in which the present invention is implemented.

In addition, the present invention provides a method for qualitative and quantitative analysis of an additive in a polymer sample using the system for analyzing an additive. According to the analysis method of the present invention, it is possible to perform the qualitative analysis and quantitative analysis of the additive simultaneously and to shorten the analysis time.

Specifically, the analysis method of the present invention comprises the steps of:

(i) dissolving a polymer sample containing an additive with 5 to 40 mL of a first solvent relative to 1 g of the sample;

(ii) precipitating the sample of the solution of (i) with 10 to 100 mL of a second solvent relative to 1 g of the sample and filtering the precipitate to separate into the sample and a solution containing the additive; and (iii) performing qualitative analysis and quantitative analysis of the solution containing the additive simultaneously by using the high throughput gas chromatographic (GC) system according to the present invention.

According to one embodiment of the present invention, the analysis of the solution containing the additive in the high throughput gas chromatographic (GC) system of step (iii) is carried out using a column for high-temperature analysis at 350° C. to 450° C.

According to one embodiment of the present invention, the polymer sample may be polyvinyl chloride (PVC), polyethylene (PE), polypropylene (PP), polystyrene (PS), polyurethane (PU), or the like.

According to one embodiment of the present invention, the additive may be a plasticizer, an antioxidant, a UV stabilizer, a brightener, a photoinitiator, a storage stabilizer, a lubricant and the like as a high molecular weight additive, for example, an additive having a molecular weight of 500 Da or more. Specifically, the additive is a plasticizer such as dioctyl phthalate (DOP), diisodecyl phthalate (DIDP), diisononyl phthalate (DINP), triethylhexyl trimellitate (TOTM), triisononyl trimellitate (TINTM), triisodecyltrimellitate (TIDTM), or a phenolic antioxidant such as the Irganox® series from Ciba.

According to one embodiment of the present invention, the first solvent may be, for example, tetrahydrofuran (THF), ethyl acetate (EA), benzene, trichloroethylene (TCE), acetone, ethylene dichloride, methyl ethyl ketone, chloroform and the like, and the second solvent may be, for example, methanol, ethanol, propylene glycol, dimethyl sulfoxide, and the like, but are not limited thereto.

Hereinafter, embodiments of the present invention will be described in detail so that those skilled in the art can easily carry out the present invention. The present invention may, however, be embodied in many different forms and should not be construed as limited to the embodiments set forth herein.

EXAMPLE 1

Qualitative Analysis and Quantitative Analysis of High molecular weight plasticizer as additive In this example, qualitative analysis and quantitative analysis of triisononyl trimellitate (TINTM: Molecular weight of 588.87) as a high molecular weight plasticizer in polyvinyl chloride (PVC) as a polymer sample were performed simultaneously using the high throughput gas chromatographic system according to the present invention.

Specifically, 0.5 g of polyvinyl chloride (PVC) containing TINTM was dissolved in 5 mL of tetrahydrofuran (THF), 20 mL of methanol was added to this solution, and the supernatant was taken to obtain a solution containing TINTM. The TINTM-containing solution was analyzed by using the high throughput gas chromatographic system according to the present invention under the following conditions.

Column: UA-5(HT/MS)(0.25 mm ID×30m L, 0.25 m d.f. capillary)
Injector: split/splitless
Injector temperature: 320° C.
Gas flow rate: column (He): 2 mL/min
Oven temperature: initial temperature and time: 100° C., 3 min
Program rate: 15° C./min
Final temperature and time: 400° C., 10 min
Interface temperature: 320° C.
FID temperature: 320° C.

The obtained results of qualitative analysis and quantitative analysis are shown in FIG. 3. From FIG. 3, it is found that the time taken for the analysis is 25 minutes.

COMPARATIVE EXAMPLE 1

In this comparative example, the qualitative analysis of TINTM in a PVC sample was performed by GC/MS and the quantitative analysis of the above plasticizer was performed by using GC/FID in the same manner as in Example 1 under the following conditions.

GC/MS analysis condition
Column: Rxi-5 ms (0.25 mm ID×30m L, 0.25m d.f. capillary)
Injector: split/splitless
Injector temperature: 300° C.
Gas flow rate: Column (He): 1 mL/min
Oven temperature: initial temperature and time: 100° C., 3 min
Program rate: 15° C./min
Final temperature and time: 300° C., 40 min
Interface temperature: 300° C.
GC/FID analysis condition
Column: HP-5(0.32 mm ID×30 m L, 0.25m d.f. capillary)
Injector: split/splitless
Injector temperature: 300° C.
Gas flow rate: Column (He): 1 mL/min
Oven temperature: initial temperature and time: 100° C., 3 min Program rate: 15° C./min
Final temperature and time: 300° C., 40 min
FID temperature: 300° C.

The obtained results of qualitative analysis and quantitative analysis are shown in FIGS. 4a and 4b, respectively. From these Figures, it is found that the time taken for the analysis is 90 minutes.

EXAMPLE 2

Qualitative Analysis and Quantitative Analysis of High Molecular Weight Antioxidant as Additive In this example, qualitative analysis and quantitative analysis of Irganox PS802 (Molecular weight of 683.2) as a high molecular weight plasticizer in heat resistant polypropylene (PP) as a polymer sample were performed simultaneously by using the high throughput gas chromatographic system according to the present invention.

Specifically, 0.5 g of polypropylene (PP) containing Irganox PS802

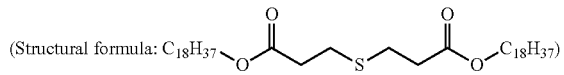

was dissolved in 10 mL of xylene containing 5 mg of butylated hydroxytoluene (BHT) and 5 mg of triphenylphosphate (TPP) at 140° C. and 10 mL of ethanol was added to this solution to obtain the PP and a solution containing Irganox PS802.

The solution containing Irganox PS802 was analyzed using the high throughput gas chromatographic system according to the present invention under the following conditions:
Column: UA-5(HT/MS)(0.25 mm ID×30m L, 0.25m d.f. capillary)
Injector: split/splitless
Injector temperature: 320° C.
Gas flow rate: Column (He): 2 mL/min
Oven temperature: initial temperature and time: 100° C., 3 min
Program rate: 15° C./min
Final temperature and time: 400° C., 10 min
Interface temperature: 320° C.
FID temperature: 320° C.

The obtained results of qualitative analysis and quantitative analysis are shown in FIG. 5. From FIG. 5, it is found that the time taken for the analysis is 25 minutes.

COMPARATIVE EXAMPLE 2

In this comparative example, the qualitative analysis of Irganox PS802 in PP sample was performed by GC/MS and the quantitative analysis of Irganox PS802 was performed by using GC/FID in the same manner as in Example 2 under the following conditions.
GC/MS analysis condition
Column: ZB-5MS(0.25 mm ID×30m L, 0.25m d.f. capillary)
Injector: split/splitless
Injector temperature: 300° C.
Gas flow rate: Column (He): 1 mL/min
Oven temperature: initial temperature and time: 100° C., 3 min
Program rate: 15° C./min
Final temperature and time: 300° C., 55 min
Interface temperature: 300° C.
GC/FID analysis condition
Column: HP-5(0.32 mm ID×30m L, 0.25m d.f. capillary)
Injector: split/splitless
Injector temperature: 300° C.
Gas flow rate: Column (He): 1 mL/min
Oven temperature: initial temperature and time: 100° C., 3 min
Program rate: 15° C./min
Final temperature and time: 300° C., 55 min
FID temperature: 300° C.

The obtained results of qualitative analysis and quantitative analysis are shown in FIGS. 6a and 6b, respectively. From these Figures, it is found that the time taken for the analysis is 110 minutes.

As can be seen from the above Examples and Comparative Examples, it was confirmed that by performing qualitative analysis and quantitative analysis of the plasticizer or the antioxidant in the polymer sample simultaneously by using the high throughput gas chromatographic system according to the present invention, the time required for the analysis can be shortened, compared to the the case where the qualitative analysis is performed by GC/MS and the quantitative analysis is performed by using GC/FID, respectively, for the plasticizer or the antioxidant in the polymer sample. Therefore, the present invention can provide an unpredictable effect from the prior art by providing technical features different from the prior art.

It will be understood by those skilled in the art that various changes in form and details may be made therein without departing from the spirit or essential characteristics of the invention. Therefore, it should be understood that the above-described embodiments are illustrative in all aspects and not restrictive. In addition, the scope of the present invention is indicated by the following claims rather than the above detailed description. Also, all changes or modifications derived from the meaning and scope of the claims and their equivalents should be construed as being included within the scope of the present invention.

DESCRIPTION OF SYMBOLS

10: High throughput chromatographic system
100: Inlet
200: Column
300: Splitter
400: First restrictor
500: Second restrictor
600: Flame Ionization detector
700: Mass spectrometer
800: Constant pressure makeup gas supply

What is claimed is:
1. A high throughput gas chromatographic (GC) system for analysis of an additive in a polymer, comprising:
an inlet through which a sample of the polymer is injected;
a column to which the sample injected from the inlet is introduced;
a splitter for distributing the sample introduced into the column, to a flame ionization detector (FID) and a mass spectrometer (MS);
a first restrictor which is a path through which the sample moves between the splitter and the flame ionization detector;

a second restrictor which is a path through which the sample moves between the splitter and the mass spectrometer;

wherein a ratio of a length of the first restrictor to a length of the second restrictor is 59.6:40.4 to 76.8:23.2, wherein the mass spectrometer is for qualitative analysis of the sample;

wherein the flame ionization detector is for quantitative analysis of the sample, and wherein the high throughput gas chromatographic system is configured to simultaneously perform qualitative analysis and quantitative analysis of the sample.

2. The high throughput gas chromatographic system according to claim 1, wherein the column is a high-temperature analytical column capable of analyzing at 350° C. to 450° C.

3. The high throughput gas chromatographic system according to claim 1, wherein a ratio of an amount of the sample supplied to the first restrictor to an amount of the sample supplied to the second restrictor is from 10:90 to 90:10.

4. A high-temperature analysis method for qualitative and quantitative analysis of an additive in a polymer, comprising:
(i) dissolving a polymer sample containing an additive with 5 to 40 mL of a first solvent relative to 1 g of the sample to form a sample solution;
(ii) precipitating the sample of the solution of (i) with 10 to 100 mL of a second solvent relative to 1 g of the sample to form a precipitate and filtering the precipitate to separate into the sample and a solution containing the additive; and
(iii) performing qualitative analysis and quantitative analysis of the solution containing the additive simultaneously by using a high throughput gas chromatographic (GC) system according to claim 1,
wherein the qualitative analysis and the quantitative analysis of the solution containing the additive in the high throughput gas chromatographic (GC) system of step (iii) is carried out by using a column for high-temperature analysis at 350° C. to 400° C.,
wherein the polymer sample is selected from the group consisting of polyvinyl chloride (PVC), polyethylene (PE), polypropylene (PP), polystyrene (PS) and polyurethane (PU),
wherein the additive is selected from the group consisting of dioctyl phthalate (DOP), diisodecyl phthalate (DIDP), diisononyl phthalate (DINP), triethylhexyl trimellitate (TOTM), triisononyl trimellitate (TINTM), triisodecyltrimellitate (TIDTM) and N,N'-(hexane-1,6-diyl)bis[3-(3,5-di-tert-butyl-4-hydroxyphenyl)propenamide], and
wherein the first solvent is selected from the group consisting of tetrahydrofuran (THF), ethyl acetate (EA), benzene, trichloroethylene (TCE), acetone, ethylene dichloride, methyl ethyl ketone and chloroform, and the second solvent is selected from the group consisting of methanol, ethanol, propylene glycol and dimethyl sulfoxide.

5. A high throughput gas chromatographic (GC) system for analysis of an additive in a polymer, comprising:
an inlet through which a sample of the polymer is injected;
a column to which the sample injected from the inlet is introduced;
a splitter for distributing the sample introduced into the column, to a flame ionization detector (FID) and a mass spectrometer (MS);
a first restrictor which is a path through which the sample moves between the splitter and the flame ionization detector;
a second restrictor which is a path through which the sample moves between the splitter and the mass spectrometer; and
a constant pressure makeup gas supply connected to the splitter and for supplying a makeup gas to the mass spectrometer via the second restrictor,
wherein the mass spectrometer is for qualitative analysis of the sample,
wherein the flame ionization detector is for quantitative analysis of the sample,
wherein the high throughput gas chromatographic system is configured to simultaneously perform qualitative analysis and quantitative analysis of the sample, and
wherein a ratio of a length of the first restrictor to a length of the second restrictor is 59.6:40.4 to 76.8:23.2.

* * * * *